(12) United States Patent
Miyamoto et al.

(10) Patent No.: US 10,189,462 B2
(45) Date of Patent: Jan. 29, 2019

(54) HYBRID VEHICLE

(71) Applicant: TOYOTA JIDOSHA KABUSHIKI KAISHA, Toyota-shi, Aichi-ken (JP)

(72) Inventors: Tomohiko Miyamoto, Toyota (JP); Tateki Hanashima, Nagoya (JP); Kenta Kumazaki, Anjo (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 149 days.

(21) Appl. No.: 15/297,618

(22) Filed: Oct. 19, 2016

(65) Prior Publication Data

US 2017/0113674 A1    Apr. 27, 2017

(30) Foreign Application Priority Data

Oct. 21, 2015 (JP) ................................. 2015-207451

(51) Int. Cl.
*B60W 10/11* (2012.01)
*B60W 10/06* (2006.01)
(Continued)

(52) U.S. Cl.
CPC ............ *B60W 20/10* (2013.01); *B60K 6/445* (2013.01); *B60K 6/547* (2013.01); *B60W 10/06* (2013.01); *B60W 10/08* (2013.01); *B60W 10/11* (2013.01); *B60W 20/30* (2013.01); *B60W 30/1843* (2013.01); *B60W 2510/087* (2013.01); *B60W 2520/10* (2013.01); *B60W 2540/10* (2013.01); *B60W 2540/103* (2013.01); *B60W 2710/081* (2013.01); *B60W 2710/083* (2013.01); *B60W 2710/1005* (2013.01); *B60Y 2200/92* (2013.01);
(Continued)

(58) Field of Classification Search
None
See application file for complete search history.

(56) References Cited

U.S. PATENT DOCUMENTS 9,505,399 B2 * 11/2016 Imamura ................ B60K 6/445
2008/0314658 A1  12/2008 Atarashi et al.
(Continued)

FOREIGN PATENT DOCUMENTS

JP    2005-170143 A    6/2005
JP    2008-162367 A    7/2008
(Continued)

*Primary Examiner* — Thomas G Black
*Assistant Examiner* — Demetra R Smith-Stewart
(74) *Attorney, Agent, or Firm* — Sughrue Mion, PLLC

(57) ABSTRACT

A hybrid vehicle is equipped with an engine that is connected to a power split mechanism, a generator, an electric motor, and also a stepped transmission that is arranged between the electric motor and a drive shaft. An electronic control unit (an ECU) with which this hybrid vehicle is equipped revises a down line downward to make a downshift likely to occur when at least one of a prescribed generator condition and a prescribed electric motor condition is fulfilled. The generator condition includes that the temperature of the generator is equal to or higher than a first reference temperature and that an absolute value of a rotational speed of the generator decreases due to the making of the downshift. The electric motor condition includes that the temperature of the electric motor is equal to or higher than a third reference temperature.

14 Claims, 10 Drawing Sheets

(51) Int. Cl.
    *B60W 10/08*     (2006.01)
    *B60W 20/10*     (2016.01)
    *B60K 6/445*     (2007.10)
    *B60K 6/547*     (2007.10)
    *B60W 20/30*     (2016.01)
    *B60W 30/184*     (2012.01)

(52) U.S. Cl.
    CPC ..... *B60Y 2300/188* (2013.01); *Y02T 10/6239* (2013.01); *Y02T 10/6286* (2013.01); *Y02T 10/7258* (2013.01); *Y10S 903/93* (2013.01)

(56) References Cited

U.S. PATENT DOCUMENTS

| | | | |
|---|---|---|---|
| 2009/0062063 A1* | 3/2009 | Yamanaka | B60K 6/445 477/5 |
| 2012/0103749 A1* | 5/2012 | Kimura | B60W 30/20 192/54.1 |
| 2015/0329105 A1* | 11/2015 | Matsui | B60K 6/48 701/22 |
| 2016/0114697 A1 | 4/2016 | Miyamoto et al. | |
| 2016/0121707 A1* | 5/2016 | Yamamoto | 180/65.22 |

FOREIGN PATENT DOCUMENTS

| | | |
|---|---|---|
| JP | 2009-179204 A | 8/2009 |
| JP | 2013-139258 A | 7/2013 |
| JP | 2014-082855 A | 5/2014 |
| JP | 2016-086560 A | 5/2016 |

\* cited by examiner

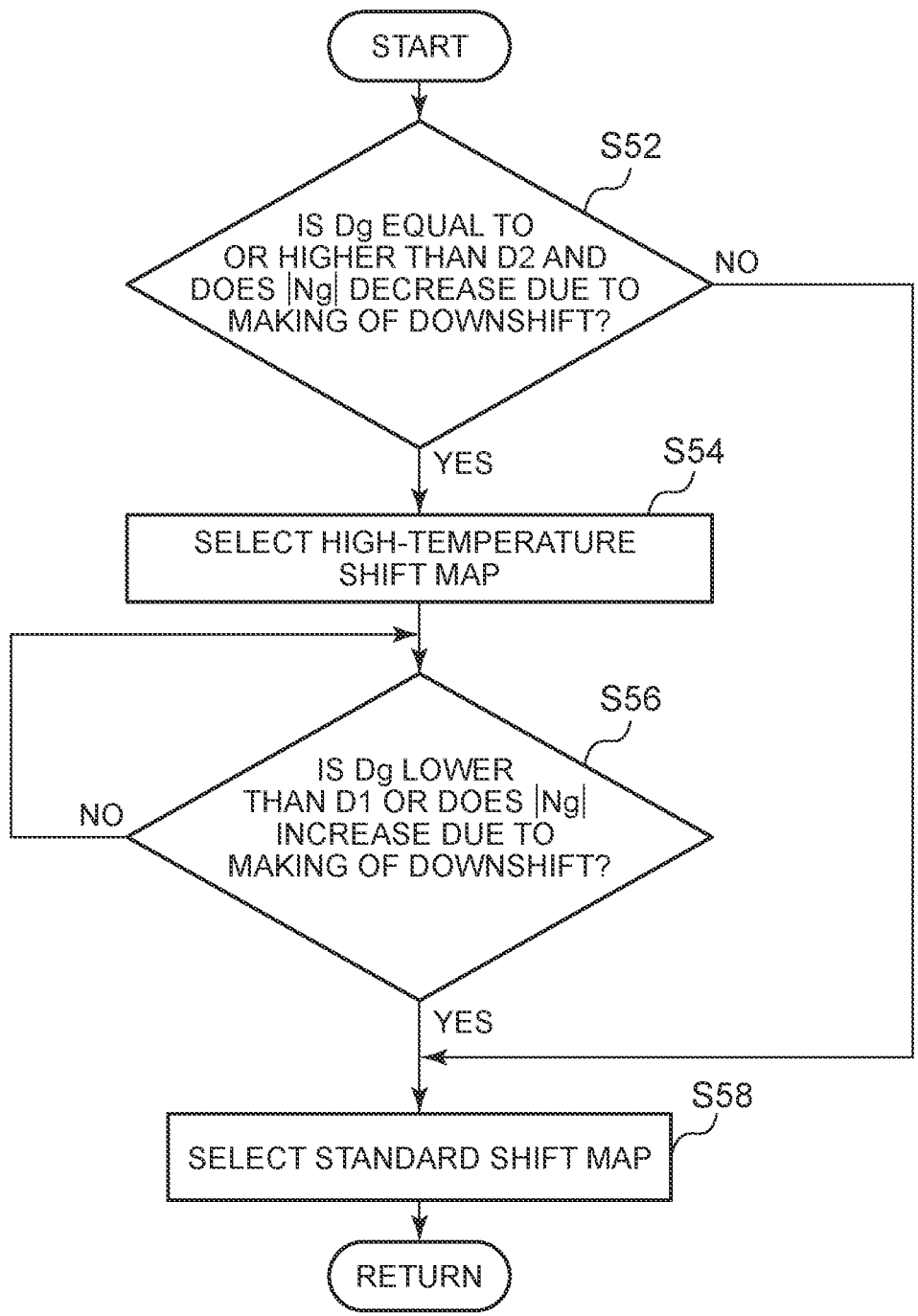

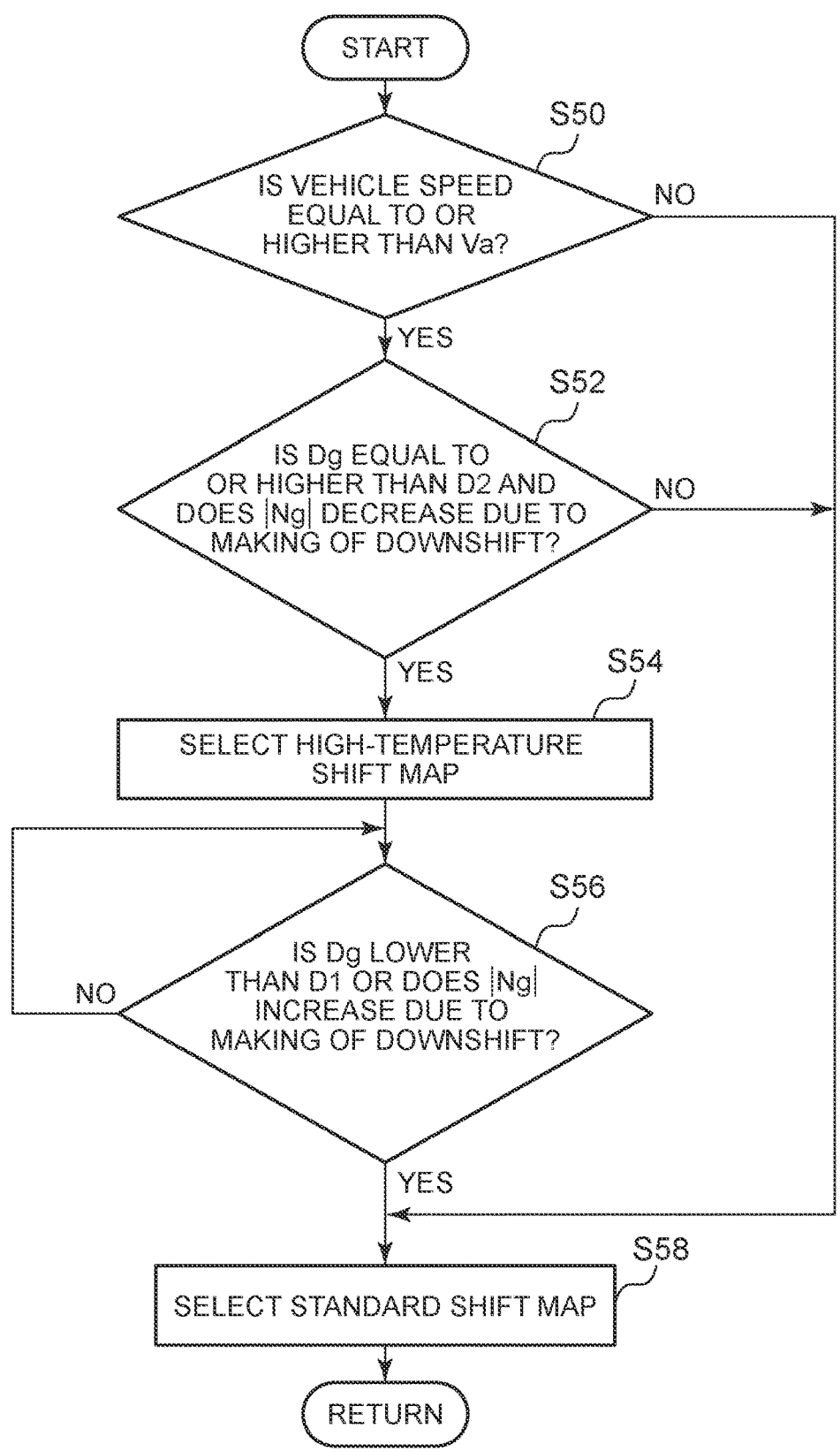

HYBRID VEHICLE

INCORPORATION BY REFERENCE

The disclosure of Japanese Patent Application No. 2015-207451 filed on Oct. 21, 2015 including the specification, drawings and abstract is incorporated herein by reference in its entirety.

BACKGROUND

1. Technical Field

The present disclosure relates to a hybrid vehicle having an engine that is connected to a power split mechanism, a generator, an electric motor, and also a stepped transmission that is arranged between the electric motor and an axle.

2. Description of Related Art

Conventionally, there is known a hybrid vehicle having an engine that is connected to a power split mechanism, a generator, an electric motor, and also a stepped transmission that is arranged between the electric motor and an axle (e.g., Japanese Patent Application Publication No. 2014-082855 (JP 2014-082855 A) and the like). In this hybrid vehicle, a changeover among gear stages of the stepped transmission is made in accordance with an accelerator opening degree for a vehicle speed.

By the way, the electric motor and the generator (which will not be distinguished from each other and refereed to hereinafter as "a rotating electrical machine") that are mounted in this hybrid vehicle generate heat as a result of the driving thereof. In the conventional hybrid vehicle, when the rotating electrical machine reaches an excessively high temperature due to this heat, the output of the vehicle is limited to prevent the temperature of the rotating electrical machine from further rising. This limitation on the output of the vehicle leads to a deterioration in driveability.

It should be noted herein that Japanese Patent Application Publication No. 2013-139258 (JP 2013-139258 A) discloses the following art. That is, when the temperature of an electric motor is outside a predetermined range, a first shift mechanism that transmits a power from the electric motor and a power from an internal combustion engine toward driving wheels is neutralized. During this neutralization, the rotational speed of the electric motor is lowered, or the electric motor is stopped from rotating. Thus, the temperature of the electric motor is lowered. According to this art, the electric motor can be prevented from reaching an excessively high temperature, but the power from the electric motor is temporarily not transmitted to the driving wheels. Therefore, the output of the entire vehicle decreases.

Besides, Japanese Patent Application Publication No. 2005-170143 (JP 2005-170143 A) discloses the following art. That is, when the remaining capacity of a battery decreases, a downshift of a stepped transmission is made to increase the torque generated by a generator. However, a rise in the temperature of a rotating electrical machine is not taken into account at all in this Japanese Patent Application Publication No. 2005-170143 (JP 2005-170143 A). Besides, a vehicle of Japanese Patent Application Publication No. 2005-170143 (JP 2005-170143 A) does not have a power split mechanism, so the art of Japanese Patent Application Publication No. 2005-170143 (JP 2005-170143 A) cannot be applied to a hybrid vehicle having a power split mechanism.

SUMMARY

In view of the circumstances of the aforementioned hybrid vehicle, the present disclosure provides a hybrid vehicle that can prevent a generator and/or an electric motor from reaching an excessively high temperature without causing a decrease in the output of the vehicle.

Thus, according to one aspect of the present disclosure, there is provided a hybrid vehicle that is equipped with an engine, a generator, an electric motor, a drive shaft, a stepped transmission, a power split mechanism and an electronic control unit. The drive shaft is configured to transmit a driving force to a wheel. The stepped transmission is configured to be interposed between the electric motor and the drive shaft. The power split mechanism is configured to (i) mechanically couple three elements to one another, the three elements being a rotary shaft of the electric motor, an output shaft of the engine and a rotary shaft of the generator, and (ii) use one of the three elements as a reaction element to transmit a power between the other two elements. The electronic control unit is configured to (i) control driving of the engine, the generator, the electric motor and the stepped transmission, (ii) make a downshift of the stepped transmission when a detected value of an accelerator opening degree for a vehicle speed reaches a down reference value, (iii) revise the down reference value below a prescribed standard value to make the downshift likely to occur when a prescribed generator condition is fulfilled, the generator condition being at least a condition that a temperature of the generator is equal to or higher than a prescribed first reference temperature, and (iv) decrease an absolute value of a rotational speed of the generator by making the downshift. According to this hybrid vehicle, there is created a situation where a downshift is likely to be made in order to fulfill the generator condition. Then, when a downshift is made, the temperature of the generator can be restrained from rising. As a result, the generator can be prevented from reaching a high temperature without lowering the output of the vehicle.

Besides, in the hybrid vehicle, the electronic control unit may be configured to return the down reference value to the standard value when the temperature of the generator drops below a second reference temperature that is lower than the first reference temperature or when the absolute value of the rotational speed of the generator increases due to making of the downshift, in a state where the down reference value is revised downward. According to this hybrid vehicle, when the necessity to make a downshift decreases, the down reference value returns to the standard value. Therefore, appropriate shift control based on the standard value can be performed.

Besides, in the hybrid vehicle, the electronic control unit may be configured to revise the down reference value below the prescribed standard value to make the downshift likely to occur when at least one of the generator condition and a prescribed electric motor condition is fulfilled. The electric motor condition may include at least a condition that a temperature of the electric motor is equal to or higher than a prescribed third reference temperature. According to this hybrid vehicle, there is created a situation where a downshift is likely to be made in order to fulfill at least one of the electric motor condition and the generator condition. Then, when a downshift is made, the temperatures of the electric motor and the generator can be restrained from rising. As a result, the electric motor and the generator can be prevented from reaching a high temperature, without lowering the output of the vehicle.

Besides, in the hybrid vehicle, the electronic control unit may be configured to return the down reference value to the standard value when both a first condition and a second condition are fulfilled in a state where the down reference value is revised downward. The first condition may be a condition that the temperature of the generator drops below a second reference temperature that is lower than the first reference temperature. The second condition may be a condition that the temperature of the electric motor drops below a fourth reference temperature that is lower than the third reference temperature or that the absolute value of the rotational speed of the generator increases due to making of the downshift. According to this hybrid vehicle, when the necessity to make a downshift decreases, the down reference value returns to the standard value. Therefore, appropriate shift control based on the standard value can be performed.

Besides, the down reference value that is set when the generator condition is fulfilled may be equal to the down reference value that is set when the electric motor condition is fulfilled. According to this hybrid vehicle, the same down reference value is set regardless of whether the generator condition or the electric motor condition is fulfilled. Therefore, the flow of the control can be simplified.

Besides, in the hybrid vehicle, the electric motor condition may further includes a condition that an output torque of the electric motor is equal to or larger than a predetermined value. According to this hybrid vehicle, the down reference value can be prevented from being changed unnecessarily.

Besides, in the hybrid vehicle, the electronic control unit may be configured to limit an output of the electric motor more when the temperature of the electric motor becomes equal to or higher than a prescribed limit start temperature than when the temperature of the electric motor is lower than the limit start temperature. The third reference temperature may be lower than the limit start temperature. According to this hybrid vehicle, the down reference value is revised downward before the limit start temperature is reached. Therefore, the electric motor can be prevented from reaching the limit start temperature.

Besides, in the hybrid vehicle, the generator condition may further includes a condition that the vehicle speed is equal to or higher than a predetermined value. According to this hybrid vehicle, the down reference value can be prevented from being changed unnecessarily.

In the hybrid vehicle, the electronic control unit may be configured to limit an output of the generator more when the temperature of the generator becomes equal to or higher than a prescribed limit start temperature than when the temperature of the generator is lower than the limit start temperature. The first reference temperature may be lower than the limit start temperature. According to this hybrid vehicle, the down reference value is revised downward before the limit start temperature is reached. Therefore, the generator can be prevented from reaching the limit start temperature.

According to another aspect of the present disclosure, there is provided a hybrid vehicle that is equipped with an engine, a generator, an electric motor, a drive shaft, a stepped transmission, a power split mechanism and an electronic control unit. The drive shaft is configured to transmit a driving force to a wheel. The stepped transmission is configured to be interposed between the electric motor and the drive shaft. The power split mechanism is configured to mechanically couple three elements to one another, the three elements being a rotary shaft of the electric motor, an output shaft of the engine and a rotary shaft of the generator and (ii) use one of the three elements as a reaction element to transmit a power between the other two elements. The electronic control unit is configured to (i) control driving of the engine, the generator, the electric motor and the stepped transmission, (ii) make a downshift of the stepped transmission when a detected value of an accelerator opening degree for a vehicle speed reaches a down reference value, and (iii) revise the down reference value below a prescribed standard value to make the downshift likely to occur when a prescribed electric motor condition is fulfilled. The electric motor condition is at least a condition that a temperature of the electric motor is equal to or higher than a prescribed third reference temperature. According to this hybrid vehicle, there is created a situation where a downshift is likely to be made in order to fulfill the electric motor condition. Then, when a downshift is made, the temperature of the electric motor can be restrained from rising. As a result, the electric motor can be prevented from reaching a high temperature, without lowering the output of the vehicle.

Besides, in the hybrid vehicle, the electronic control unit may be configured to return the down reference value to the standard value when the temperature of the electric motor drops below a fourth reference temperature that is lower than the third reference temperature in a state where the down reference value is revised downward. According to this hybrid vehicle, when the necessity to make a downshift decreases, the down reference value returns to the standard value. Therefore, appropriate shift control based on the standard value can be performed.

Besides, in the hybrid vehicle, the electric motor condition may further includes a condition that an output torque of the electric motor is equal to or larger than a predetermined value. According to this hybrid vehicle, the down reference value can be prevented from being changed unnecessarily.

In another preferred aspect of the present disclosure, the electronic control unit may be configured to limit an output of the electric motor more when the temperature of the electric motor becomes equal to or higher than a prescribed limit start temperature than when the temperature of the electric motor is lower than the limit start temperature. The third reference temperature may be lower than the limit start temperature. According to this hybrid vehicle, the down reference value is revised downward before the limit start temperature is reached. Therefore, the electric motor can be prevented from reaching the limit start temperature.

According to the hybrid vehicle of the present disclosure as described above, there is created a situation where a downshift is likely to be made in order to fulfill the generator condition and/or the electric motor condition. Then, when a downshift is made, the temperatures of the electric motor and the generator or the temperature of the electric motor or the generator can be restrained from rising. As a result, the generator and/or the electric motor can be prevented from reaching an excessively high temperature, without lowering the output of the vehicle.

BRIEF DESCRIPTION OF THE DRAWINGS

Features, advantages, and technical and industrial significance of an exemplary embodiment of the present disclosure will be described below with reference to the accompanying drawings, in which like numerals denote like elements, and wherein:

FIG. 10 is a flowchart showing the flow of a shift map selection process in a third modification example of the present embodiment of the disclosure; and FIG. 11 is a flowchart showing the flow of a shift map selection process in a fourth modification example of the present embodiment of the disclosure.

DETAILED DESCRIPTION OF EMBODIMENT

Figure 1:
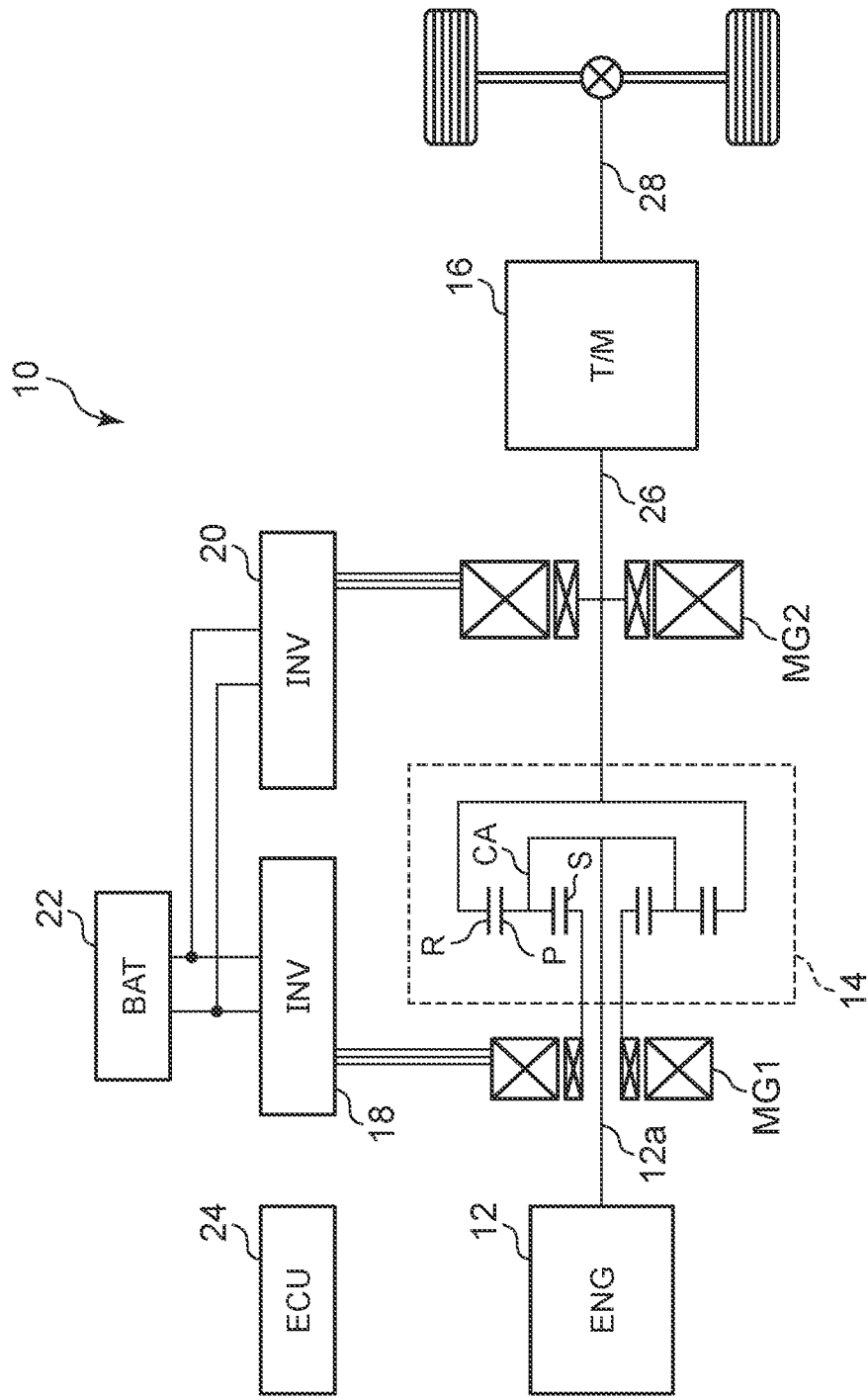
FIG. 1 is a view showing the configuration of a hybrid vehicle as the embodiment of the disclosure.

The embodiment of the disclosure will be described hereinafter with reference to the drawings. FIG. 1 is a view showing the configuration of a hybrid vehicle 10 as the embodiment of the disclosure. As shown in FIG. 1, the hybrid vehicle 10 is equipped with an engine 12, a first rotating electrical machine MG1, a second rotating electrical machine MG2, a power split mechanism 14, a transmission 16, inverters 18 and 20, a battery 22 and an electronic control unit (an ECU) 24.

The engine 12 is an internal combustion engine that outputs a power through the use of a hydrocarbon fuel such as gasoline, light fuel or the like. The engine 12 is subjected to operation control such as fuel injection control, ignition control, intake air amount adjustment control and the like by the ECU 24. In order to perform operation control of this engine 12, parameters detected by various sensors (not shown), for example, a pressure value in a fuel chamber, an air-fuel ratio, an intake air amount and the like are input to the ECU 24.

The power split mechanism 14 includes a sun gear S as an external gear, a ring gear R as an internal gear that is arranged concentrically with the sun gear S, a plurality of pinions that mesh with the sun gear S and that mesh with the ring gear R, and a carrier CA that holds the plurality of the pinions such that the plurality of the pinions can rotate around their own axes and around the carrier CA. The power split mechanism 14 is configured as a planetary gear mechanism that performs a differential action using the sun gear S, the ring gear R and the carrier CA as rotary elements.

A crankshaft (an output shaft) 12a of the engine 12 is coupled to the carrier CA. A rotary shaft of the first rotating electrical machine MG1 is coupled to the sun gear S. A rotary shaft of the second rotating electrical machine MG2 is coupled to the ring gear R. The power split mechanism 14 mechanically couples three elements to one another, the three elements are this crankshaft 12a, the rotary shaft of the first rotating electrical machine MG1 and the rotary shaft of the second rotating electrical machine MG2, and one of these three elements is used as a reaction element to enable the transmission of a power between the other two elements. During hybrid running in which while the vehicle runs through the use of the power output from the engine 12 and the power output from the second rotating electrical machine MG2, the first rotating electrical machine generates electric power, the power split mechanism 14 distributes the power from the engine 12, which is input to the carrier CA, to the sun gear S side and the ring gear R side in accordance with the gear ratio therebetween. The power output to the ring gear R is output from the rotary shaft of the ring gear R to the wheels via the rotary shaft of the second rotating electrical machine MG2, the transmission 16, the drive shaft 28 and a differential gear.

Each of the first rotating electrical machine MG1 and the second rotating electrical machine MG2 is a well-known synchronous generator motor that can be driven as a generator and that can also be driven as an electric motor. The first rotating electrical machine MG1 is mainly used as a generator, and the second rotating electrical machine MG2 is mainly used as an electric motor. It should be noted, however, that the first rotating electrical machine MG1 functions as an electric motor (a starter motor) that is driven by being supplied with electric power from the battery 22 when the engine 12 is started.

The first rotating electrical machine MG1 and the second rotating electrical machine MG2 exchange electric power with the battery 22 via the inverters 18 and 20. Electric lines that connect the inverters 18 and 20 to the battery 22 include a positive electrode bus bar and a negative electrode bus bar, which are shared by the respective inverters 18 and 20. Thus, the electric power generated by one of the first rotating electrical machine MG1 and the second rotating electrical machine MG2 can be consumed by the other rotating electrical machine. Accordingly, the battery 22 is charged/discharged with the electric power from the first rotating electrical machine MG1 and the second rotating electrical machine MG2 or the insufficient electric power. Incidentally, when the balance of electric power is maintained by the first rotating electrical machine MG1 and the second rotating electrical machine MG2, the battery 22 is not charged/discharged.

Both the first rotating electrical machine MG1 and the second rotating electrical machine MG2 are drivingly controlled by the ECU 24. For this driving control of the first rotating electrical machine MG1 and the second rotating electrical machine MG2, parameters detected by various sensors (not shown), for example, rotational speeds of the respective rotating electrical machines, values of currents applied to the respective rotating electrical machines, temperatures of the rotating electrical machines, temperatures of the inverters 18 and 20, a temperature of a cooling medium for cooling the rotating electrical machines and the like are input to the ECU 24. The ECU 24 generates and outputs switching control signals of the inverters 18 and 20 based on these parameters.

The transmission 16 is a stepped transmission that is interposed between the second rotating electrical machine MG2 and the drive shaft 28 and that can change the speed ratio in a plurality of stages. The transmission 16 is constituted of, for example, two planetary gears, a plurality of clutches and a plurality of brakes. Then, the speed ratio can be changed by making a changeover in states (engaged states or released states) of the plurality of the clutches and the plurality of the brakes. The shifting of this transmission 16 is carried out based on a control signal from the ECU 24. In order to perform shift control of this transmission 16, a vehicle speed V and an accelerator opening degree Acc are input to the ECU 24. Besides, as will be described later, the ECU 24 performs shift control of the transmission 16 with reference to shift maps stored in advance. However, in order to select and change over the shift maps to be referred to, the temperatures of the first rotating electrical machine MG1 and the second rotating electrical machine MG2 and the like are also input to the ECU 24.

The battery 22 is a secondary battery which is charged with electric power and from which electric power is discharged. This battery 22 is managed by an ECU 24. Signals necessary to manage the battery 22, for example, a voltage across terminals of the battery 22, a charge/discharge current of the battery 22, a temperature of the battery 22 and the like are input to the ECU 24. The ECU 24 also calculates a remaining capacity (an SOC) based on an integrated value of a charge/discharge current detected by a current sensor to manage the battery 22.

As described hitherto, the ECU 24 functions as an electronic control unit that controls the driving of the engine 12, the first rotating electrical machine MG1, the second rotating electrical machine MG2, the transmission 16 and the like and that manages the battery 22. The ECU 24 has a CPU, a memory and the like. Incidentally, in the present embodiment of the disclosure, the ECU 24 is described as a single region. However, the ECU 24 may be constituted of a plurality of units. For example, the ECU 24 may be constituted of separate ECU's, namely, an engine ECU that mainly controls the driving of the engine 12, a motor ECU that mainly controls the driving of the first rotating electrical machine MG1 and the second rotating electrical machine MG2, a battery ECU that mainly manages the battery 22, and a hybrid ECU that controls the driving of the plurality of these ECU's.

Running modes of the hybrid vehicle 10 configured as described above include a hybrid running mode, a motor running mode, an engine direct torque running mode and the like. In the hybrid running mode, with a view to causing the vehicle to run, both the engine 12 and the second rotating electrical machine MG2 are driven, and electric power is generated by the first rotating electrical machine MG1 through the use of part of the power from the engine 12. In the motor running mode, the engine 12 is stopped from being operated, and the vehicle is caused to run by the power from the second rotating electrical machine MG2. In the engine direct torque running mode, the second rotating electrical machine MG2 is stopped from being operated, and the vehicle is caused to run only by a torque that is directly transmitted from the engine 12 to the rotary shaft of the ring gear R via the power split mechanism 14 (this torque is also referred to as an engine direct-transmission torque) while the first rotating electrical machine MG1 is in charge of the reaction force of an engine torque.

Next, shift control of the transmission 16 will be described. As described already, in the hybrid vehicle 10 according to the present embodiment of the disclosure, the transmission 16 is interposed between the second rotating electrical machine MG2 and the drive shaft 28. The ECU 24 controls the shifting of the transmission 16 in accordance with the accelerator opening degree Acc for the detected vehicle speed V. In order to perform this shift control, shift maps in which a down reference value as the accelerator opening degree Acc for the vehicle speed V in making a downshift and an up reference value as the accelerator opening degree Acc for the vehicle speed V in making an upshift are recorded are stored in advance in the ECU 24.

Figure 2:
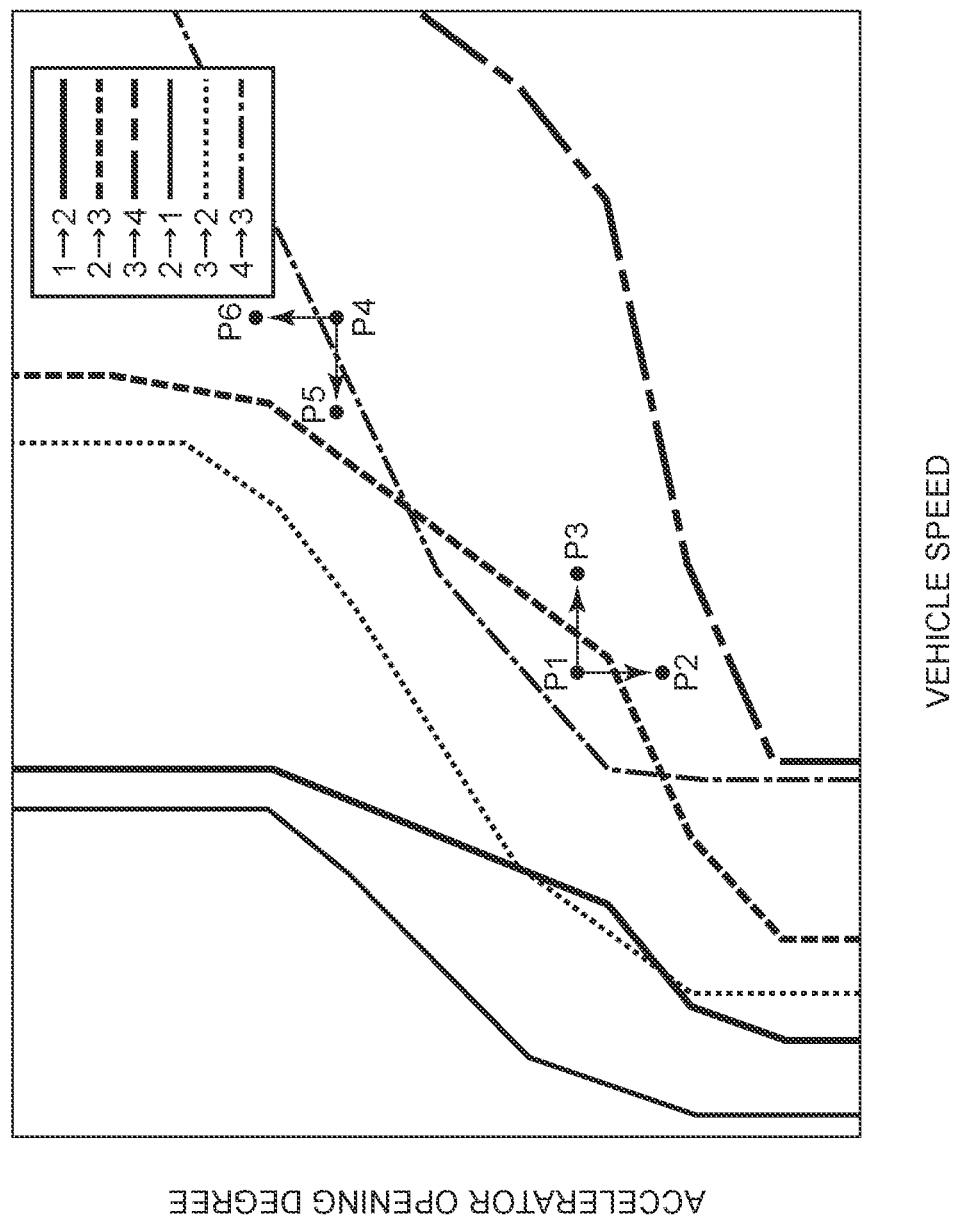
FIG. 2 is a view showing an exemplary shift map of the hybrid vehicle.

FIG. 2 is a view showing an exemplary shift map. In FIG. 2, the axis of abscissa represents the vehicle speed V, and the axis of ordinate represents the accelerator opening degree Acc. In FIG. 2, each of thick lines (a thick solid line, a thick broken line and a thick alternate long and short dash line) is a line representing a value of the accelerator opening degree Acc in making an upshift (reducing the speed ratio of the transmission 16), namely, an up reference value. A line representing the up reference value like these thick lines will be referred to hereinafter as "an up line". Besides, each of thin lines (a thin solid line, a thin broken line and a thin long and short dash line) is a line representing a value of the accelerator opening degree Acc in making a downshift (increasing the speed ratio of the transmission 16), namely, a down reference value. A line representing the down reference value like these thin lines will be referred to hereinafter as "a down line".

The ECU 24 monitors the actual vehicle speed V and the actual accelerator opening degree Acc at intervals of a predetermined time, and collates an operating point determined by the obtained vehicle speed V and the detected value of the accelerator opening degree Acc with this shift map. Then, when the operating point crosses an up line corresponding to a current gear stage (reaches the up reference value) as a result of a decrease in the accelerator opening degree Acc for the vehicle speed V, the ECU 24 makes an upshift of the transmission 16. For example, in the case where a second speed is selected as a gear stage of the transmission 16, when the operating point determined by the vehicle speed V and the accelerator opening degree Acc moves from a point P1 to a point P2 and a point P3 and crosses the up line for the second speed (the thick broken line), the ECU 24 raises the gear stage of the transmission 16 from the second speed to a third speed.

By the same token, when the operating point crosses a down line corresponding to a current gear stage (reaches the down reference value) as a result of an increase in the accelerator opening degree Acc for the vehicle speed V, the ECU 24 makes a downshift of the transmission 16. For example, in the case where a fourth speed is selected as a gear stage of the transmission 16, when the operating point determined by the vehicle speed V and the accelerator opening degree Acc moves from a point P4 to a point P5 and a point P6 and crosses a down line corresponding to the third speed (a thin alternate long and short dash line), the ECU 24 lowers the gear stage of the transmission 16 from the fourth speed to the third speed.

Figure 3:
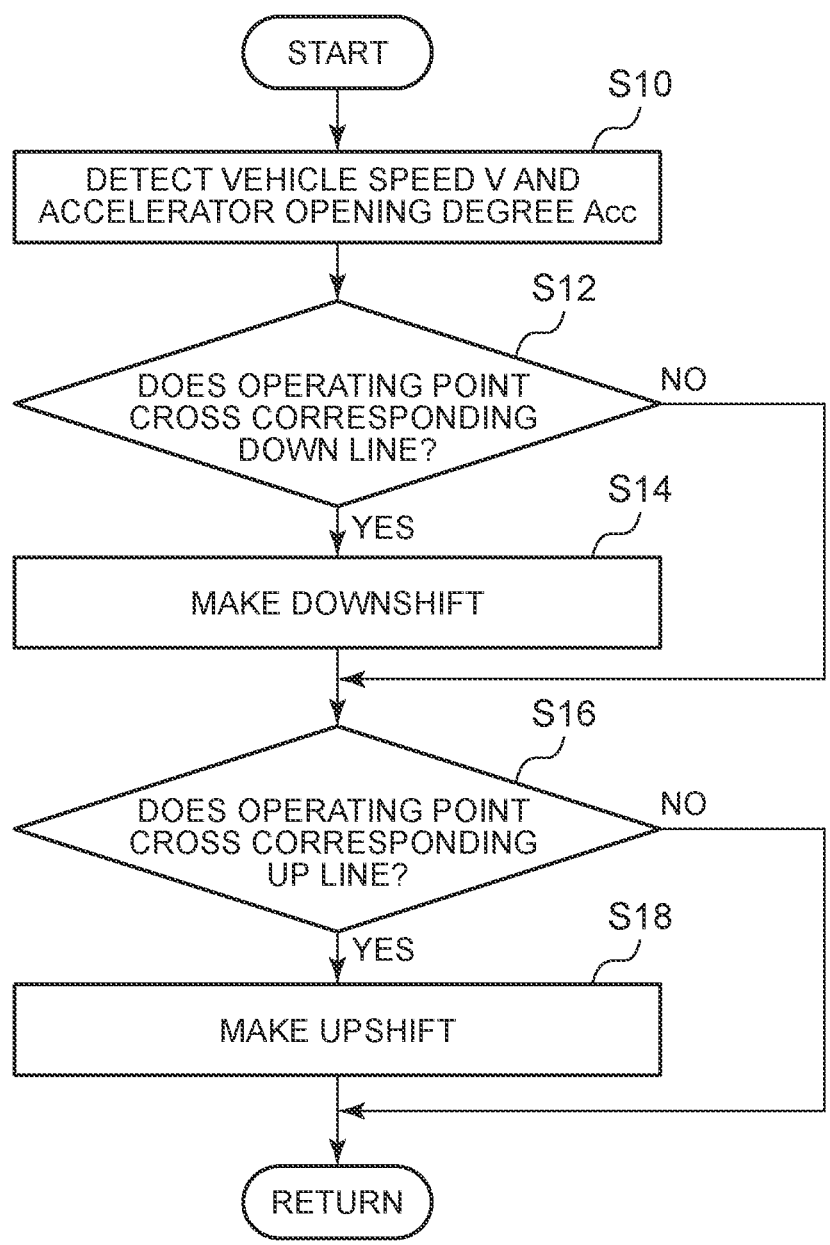
FIG. 3 is a flowchart showing the flow of shift control of the hybrid vehicle.

FIG. 3 is a flowchart showing the flow of this shift control. As shown in FIG. 3, the ECU 24 monitors the vehicle speed V and the accelerator opening degree Acc to control the transmission 16 (S10). When the vehicle speed V and the accelerator opening degree Acc are obtained, the ECU 24 subsequently confirms whether or not the operating point determined by the vehicle speed V and the accelerator opening degree Acc has crossed a down line corresponding to a current gear stage (S12). In concrete terms, if the operating point specified at the time of current sampling is located on the other side (on the left side or the upper side) of the operating point specified at the time of last sampling across the corresponding down line, it is determined that the operating point has crossed the down line. If the operating point has crossed the down line, the ECU 24 makes a downshift to lower the speed ratio of the transmission 16 by one stage (S14). On the other hand, if the operating point has not crossed the down line, the ECU 24 confirms whether or not the operating point has crossed an up line corresponding to the current gear stage (S16). In concrete terms, if the operating point specified at the time of current sampling is located on the other side (on the right side or the lower side) of the operating point specified at the time of last sampling across the corresponding up line, it is determined that the operating point has crossed the up line. Then, if the operating point has crossed the up line, the ECU 24 makes an upshift to raise the speed ratio of the transmission 16 by one stage (S18). On the other hand, if the operating point has crossed neither the up line nor the down line (No in S12 and S16), the ECU 24 returns to step S10 while maintaining the current gear stage. The ECU 24 repeats the same process afterward. As described above, the ECU 24 collates the vehicle speed V and the accelerator opening degree Acc with shift maps stored in advance, and shifts the transmission 16.

By the way, it is known that the first rotating electrical machine MG1 and the second rotating electrical machine MG2 generate heat and rise in temperature in accordance with the driving thereof. In particular, when the vehicle continues to run at high speed for a long time at a high gear stage or repeatedly runs in an overtaking manner or uphill, a large load is applied to each of the first rotating electrical machine MG1 and the second rotating electrical machine MG2. As a result, each of the first rotating electrical machine MG1 and the second rotating electrical machine MG2 may reach an excessively high temperature. When each of the first rotating electrical machine MG1 and the second rotating electrical machine MG2 reaches an excessively high temperature in this manner, the life of each of the first rotating electrical machine MG1 and the second rotating electrical machine MG2 is shortened, or damage is caused thereto. Thus, it is conventionally proposed to limit the output of the vehicle and prevent the temperatures of the first rotating electrical machine MG1 and the second rotating electrical machine MG2 from rising when a temperature Dg of the first rotating electrical machine MG1 or a temperature Dm of the second rotating electrical machine MG2 exceeds a prescribed limit start temperature D3. However, according to this art, the first rotating electrical machine MG1 and the second rotating electrical machine MG2 can be prevented from reaching an excessively high temperature, but the power performance of the vehicle deteriorates, and the driveability decreases.

Figure 4:
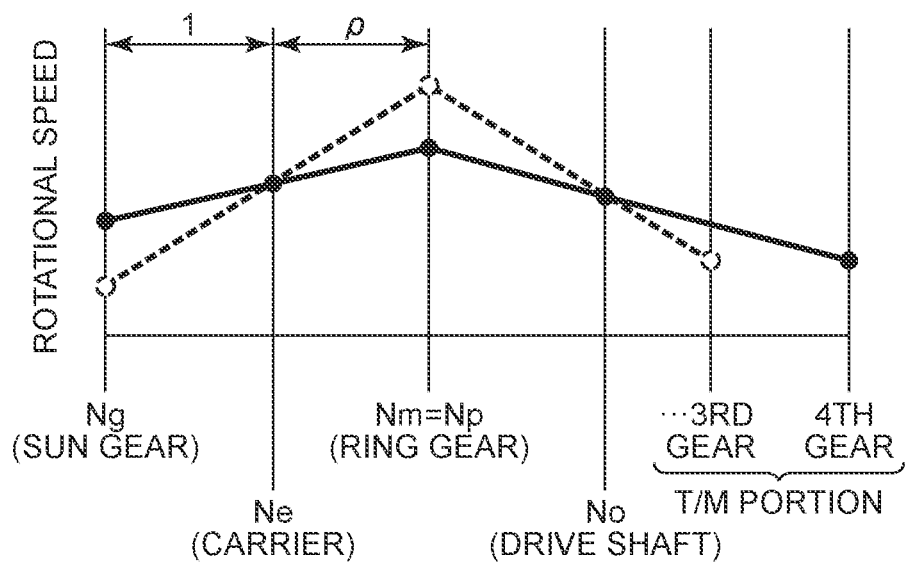
FIG. 4 is an alignment chart of a drive mechanism of the hybrid vehicle.
Figure 5:
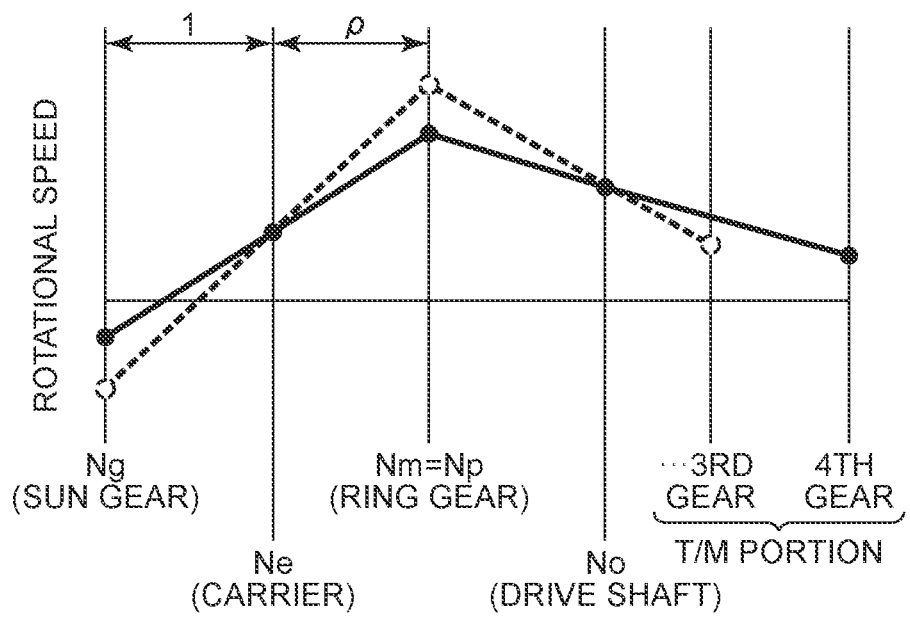
FIG. 5 is an alignment chart of the drive mechanism of the hybrid vehicle.
Figure 6:
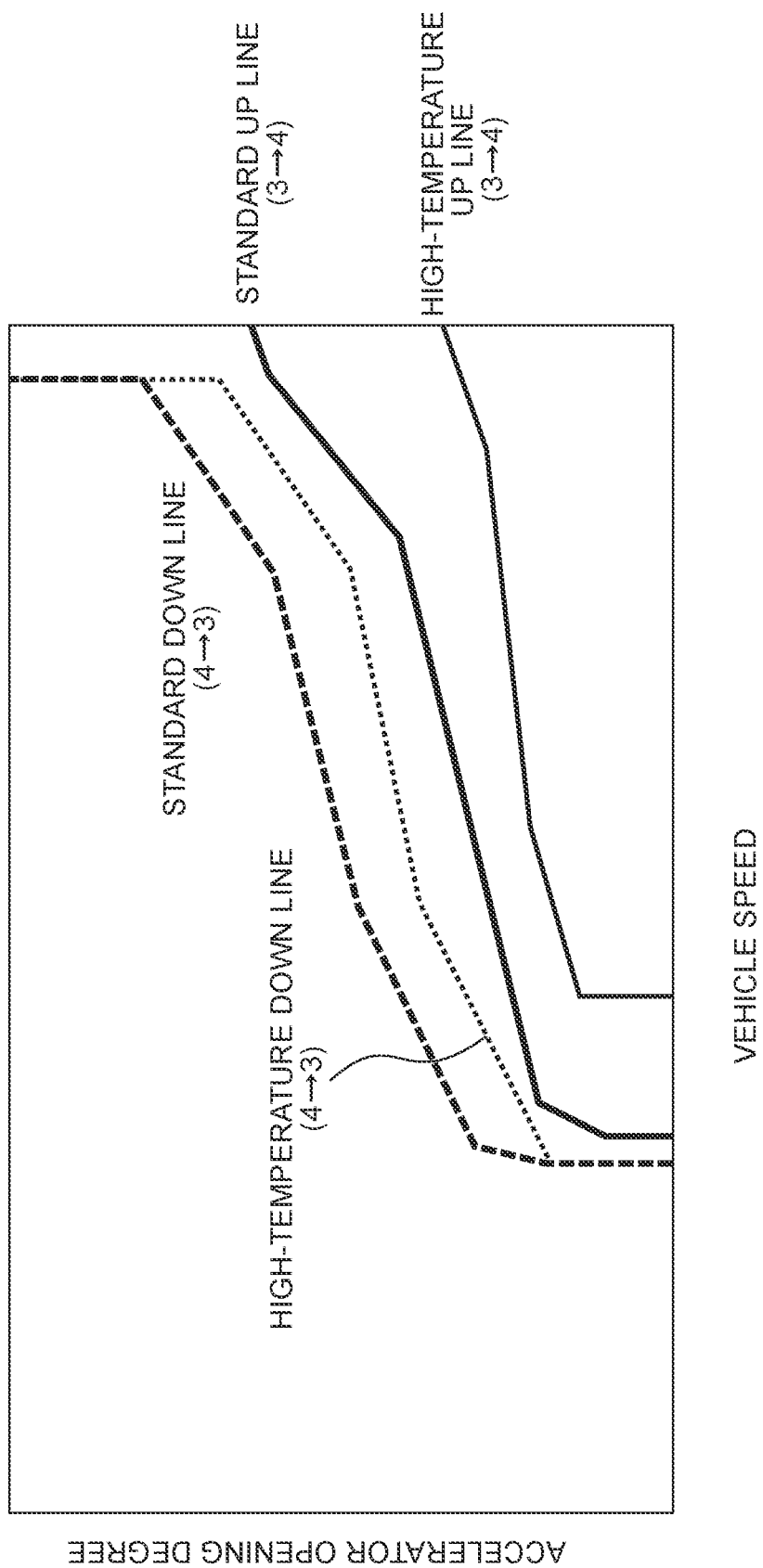
FIG. 6 is an image view showing how a down line and an up line are revised downward in the shift map of the hybrid vehicle.

Thus, in the present embodiment of the disclosure, with a view to preventing the first rotating electrical machine MG1 and the second rotating electrical machine MG2 from reaching an excessively high temperature without deteriorating the power performance of the vehicle, a changeover between the shift maps is made in accordance with the temperatures of the first rotating electrical machine MG1 and the second rotating electrical machine MG2, thereby making a downshift likely to occur. This will be described with reference to FIGS. 4 to 6. FIGS. 4 and 5 are alignment charts of the drive mechanism of the hybrid vehicle 10, and FIG. 6 is a view showing an exemplary shift map.

As shown in FIG. 4, the rotational speed of the sun gear S constituting the power split mechanism 14 (a rotational speed Ng of the first rotating electrical machine MG1), the rotational speed of the carrier CA (a rotational speed Ne of the engine 12) and the rotational speed of the ring gear R (a rotational speed Nm of the second rotating electrical machine MG2) establish such a relationship as to be linked with one another by a straight line on the alignment chart. That is, if the rotational speeds of any two of the rotary elements are determined, the rotational speed of the other rotary element is also determined. Besides, a rotational speed No of the drive shaft 28 is a value obtained by multiplying the rotational speed (Nm) of the ring gear R by the reduction ratio of the transmission 16.

In this drive mechanism, in order to reduce the temperatures of the first rotating electrical machine MG1 and the second rotating electrical machine MG2, it is advisable to make a downshift to lower the gear stage of the transmission 16. That is, in general, the rotational speed No of the drive shaft 28 remains unchanged before and after shifting. Therefore, when a downshift is made, the rotational speed Nm of the ring gear R (the second rotating electrical machine MG2) rises. Besides, in general, the rotational speed Ne of the engine 12 also remains unchanged before and after shifting. Therefore, when a downshift is made, the rotational speed Ng of the first rotating electrical machine MG1 falls as shown in FIG. 4. That is, by making a downshift, the rotational speed Nm of the second rotating electrical machine MG2 rises, and the rotational speed Ng of the first rotating electrical machine MG1 falls.

In this manner, the temperature of the second rotating electrical machine is restrained from rising due to a rise in the rotational speed Nm of the second rotating electrical machine MG2. Besides, in the case of the first rotating electrical machine MG1, when the absolute value of the rotational speed Ng thereof decreases, the temperature thereof is restrained from rising. The reason for this will be described. The main cause of a rise in the temperature of a rotating electrical machine is the heat generated by losses. Therefore, in order to prevent the temperature of the rotating electrical machine from rising, it is advisable to reduce the losses. The main losses caused to the rotating electrical machine include a copper loss caused by a resistance component of a coil, an iron loss caused as a result of the physical properties of a core, and a mechanical loss such as rotational friction or the like that is caused as a rotor rotates. Among these losses, the copper loss is a loss dependent on the current. As the current flowing through the coil decreases, the copper loss also decreases. Besides, in general, the current depends on the torque. Therefore, when the output torque of the rotating electrical machine becomes small, the copper loss also becomes small. The iron loss and the mechanical loss are losses dependent on the rotational speed of the rotating electrical machine. As the absolute value of the rotational speed decreases, the iron loss and the mechanical loss also decrease. Accordingly, in the case where the temperatures of the first rotating electrical machine MG1 and the second rotating electrical machine MG2 are restrained from rising, at least one of the torque and the absolute value of the rotational speed of each of the rotating electrical machines needs to be lowered.

Thus, the torques and rotational speeds of the first rotating electrical machine MG1 and the second rotating electrical machine MG2 before and after a downshift will be reviewed. A power Po that is output to the drive shaft 28 is expressed by Expression 1 shown below. Incidentally, in Expression 1, Tep denotes an engine direct-transmission torque that is transmitted to the input shaft 26 of the transmission 16, Np denotes a rotational speed of the input shaft 26 of the transmission 16, No denotes a rotational speed of the drive shaft 28, and Grp denotes the inverse of a reduction ratio Gat of the transmission 16.

$$Po = Tep \times Np + Tm \times No \times Gap = Tep \times Np + Tm \times Np \quad \text{(Expression 1)}$$

It should be noted herein that the rotational speed Np of the input shaft of the transmission 16 is equal to the rotational speed Nm of the second rotating electrical machine MG2 (Np=Nm). Besides, the engine direct-transmission torque Tep is expressed as Tep=1/(1+ρ)×Te, when ρ denotes the speed ratio of the power split mechanism 14 and Te denotes the output torque of the engine 12. Accordingly, Expression 1 can be expressed as Expression 2 shown below. Furthermore, Expression 2 can be expanded like Expression 3. Incidentally, Pm denotes an output power of the second rotating electrical machine MG2.

$$Po = 1/(1+\rho) \times Te \times Nm + Tm \times Nm = 1/(1+\rho) \times Te \times Nm + Pm \quad \text{(Expression 2)}$$

It should be noted herein that the speed ratio ρ of the power split mechanism 14 is always constant regardless of the gear stage of the transmission 16 in Expression 2. Besides, the output power Po to the drive shaft 28 and the output torque Te of the engine 12 fluctuate over a long period. However, the output power Po to the drive shaft 28 and the output torque Te of the engine 12 can be regarded as constant values that do not fluctuate, in a short period across a downshift. Accordingly, when the rotational speed Nm of the second rotating electrical machine MG2 becomes high due to the making of a downshift, the first term $(1/(1+\rho) \times Te \times Nm)$ in the right side of Expression 2 becomes large. Besides, the second term Pm in the right side of Expression 2 is a value obtained by subtracting $(1/(1+\rho) \times Te \times Nm)$ from the output power Po, which is a substantially constant value. Therefore, when the rotational speed Nm of the second rotating electrical machine MG2 becomes high due to the making of a downshift, the second term Pm in the right side of Expression 2 becomes small. That is, when the rotational speed Nm of the second rotating electrical machine MG2 becomes high due to the making of a downshift, the output power Pm of the second rotating electrical machine MG2 becomes small. Then, when the rotational speed Nm of the second rotating electrical machine MG2 becomes high due to the making of a downshift, an output torque Tm that is obtained by dividing this output power Pm by the rotational speed Nm also becomes small.

That is, when the rotational speed Nm of the second rotating electrical machine MG2 becomes high due to the making of a downshift, both the output power Pm and the torque Tm of the second rotating electrical machine MG2 decrease. Then, when the torque Tm of the second rotating electrical machine MG2 decreases, the copper loss of the second rotating electrical machine MG2 also decreases correspondingly. Therefore, the temperature of the second rotating electrical machine MG2 can be restrained from rising. Incidentally, when a downshift is made, the torque Tm and cooper loss of the second rotating electrical machine MG2 decrease, but the rotational speed Nm rises. Therefore, the iron loss and the mechanical loss increase. However, in general, within a low-rotation, large-torque operating range where the second rotating electrical machine MG2 is mainly used, the copper loss is more predominant than the iron loss and the mechanical loss. The iron loss and the mechanical loss are sufficiently smaller than the copper loss. Therefore, even when the iron loss and the mechanical loss increase to a certain degree as a result of a rise in the rotational speed Nm, the copper loss decreases by the amounts of increase in the iron loss and the mechanical loss or more. Therefore, the temperature of the second rotating electrical machine MG2 is effectively restrained from rising.

Next, the first rotating electrical machine MG1 will be reviewed. A torque Tg and the rotational speed Ng of the first rotating electrical machine MG1 can be expressed by Expression 3 and Expression 4 shown below, respectively.

$$Tg = -\rho/(1+\rho) \times Te \quad \text{(Expression 3)}$$

$$Ng = (1+\rho)/\rho \times Ne - 1/\rho \times Nm \quad \text{(Expression 4)}$$

It should be noted herein that the speed ratio ρ of the power split mechanism 14 is always constant, and that the torque Te of the engine 12 is substantially constant before and after a downshift, as described above. Accordingly, it is apparent that the torque Tg of the first rotating electrical machine MG1 expressed by Expression 3 is also substantially constant before and after a downshift. When the torque Tg is constant, it is safe to assume that the copper loss is also substantially constant.

On the other hand, as is apparent from Expression 4 and FIG. 4, the rotational speed Ng of the first rotating electrical machine MG1 falls when the rotational speed Nm of the second rotating electrical machine MG2 rises due to the making of a downshift. Then, the iron loss and the mechanical loss also change due to a fall in the rotational speed Ng. In more concrete terms, as shown in FIG. 4, when the rotational speed Ng of the first rotating electrical machine MG1 is positive (Ng>0) and the absolute value |Ng| of the rotational speed decreases due to the making of a downshift, only the iron loss and mechanical loss of the first rotating electrical machine MG1 decrease while the copper loss thereof does not change. Therefore, the temperature of the first rotating electrical machine MG1 is restrained from rising.

It should be noted, however, that when the rotational speed Ng of the first rotating electrical machine MG1 is negative (Ng<0) and the absolute value |Ng| of the rotational speed increases due to the making of a downshift, only the iron loss and mechanical loss of the first rotating electrical machine MG1 increase while the copper loss thereof does not change, as shown in FIG. 5. In this case, the temperature of the first rotating electrical machine MG1 rather rises instead of being restrained from rising.

As described above, in the drive mechanism of the hybrid vehicle 10, the temperatures of the rotating electrical machines can be restrained from rising by making a downshift to raise the rotational speed of the second rotating electrical machine MG2 and lower the absolute value of the rotational speed of the first rotating electrical machine MG1. Thus, in the present embodiment of the disclosure, when the temperature of the second rotating electrical machine MG2 is high and/or the temperature of the first rotating electrical machine MG1 is high and the absolute value of the rotational speed of the first rotating electrical machine MG1 decreases due to the making of a downshift, the shift lines in the selected shift map are revised downward to make a downshift likely to occur. This will be described with reference to FIG. 6.

In the present embodiment of the disclosure, the ECU 24 stores two shift maps, namely, a standard shift map and a high-temperature shift map. The standard shift map is a shift map as shown in FIG. 2, and is used when neither an electric motor condition nor a generator condition, which will be described later, is fulfilled. On the other hand, the high-temperature shift map is a shift map where shift lines are revised downward in comparison with the standard shift map. FIG. 6 is a view showing an example of downward revision of the shift lines. In FIG. 6, broken lines indicate down lines from the fourth speed to the third speed, and solid lines indicate up lines from the third speed to the fourth speed. Besides, in FIG. 6, thick lines indicate shift lines in the standard shift map, and thin lines indicate shift lines in the high-temperature shift map.

As shown in FIG. 6, the down line in the high-temperature shift map (the thin broken line) indicates that the accelerator opening degree Acc for the vehicle speed V is revised downward in comparison with the down line in the standard shift map (the thick broken line). Therefore, if shift control is performed based on the high-temperature shift map, a downshift is made even in the case where the accelerator opening degree Acc is smaller or the vehicle speed is higher than when shift control is performed based on the standard shift map. As a result, according to the high-temperature shift map, a downshift is more likely to occur than in the case of the standard shift map. Then, by making a downshift, the losses of the first rotating electrical machine MG1 and the second rotating electrical machine MG2 are reduced, and hence, the temperatures thereof are restrained from rising.

Besides, in the case where only the down line is revised downward and the up line is not revised downward, the hysteresis therebetween becomes small, so the gears are changed with relatively high frequency. This high-frequency gear change is unfavorable because a deterioration in driveability and the like are incurred. Thus, in the high-temperature shift map, the up line as well as the down line is revised downward. That is, as shown in FIG. 6, the up line in the high-temperature shift map (the thin solid line) indicates that the accelerator opening degree Acc for the vehicle speed V is revised downward in comparison with the up line in the standard shift map (the thick solid line). Thus, the frequency of gear change can be reduced, and the driveability can be enhanced.

The ECU 24 stores these two shift maps, and changes over the map to be referred to in shift control according to the circumstances. In concrete terms, the ECU 24 performs shift control with reference to the high-temperature shift map when at least one of the electric motor condition and the generator condition is fulfilled, and with reference to the standard shift map when neither the electric motor condition nor the generator condition is fulfilled. It should be noted herein that the electric motor condition is that the temperature Dm of the second rotating electrical machine MG2 is equal to or higher than a prescribed reference temperature D2. Besides, the generator condition is that the temperature Dg of the first rotating electrical machine MG1 is equal to or higher than the reference temperature D2 and that the absolute value |Ng| of the rotational speed of the first rotating electrical machine MG1 decreases due to the making of a downshift. Incidentally, the reference temperature D2 is an example of each of the first reference temperature and the third reference temperature set forth in the claims of the present application. This reference temperature D2 is a temperature that makes it possible to prevent the output of the vehicle from being limited as a result of a rise in temperature. That is, in the present embodiment of the disclosure, the first rotating electrical machine MG1 and the second rotating electrical machine MG2 start limiting the output of the entire vehicle when the temperatures of the first rotating electrical machine MG1 and the second rotating electrical machine MG2 become equal to or higher than the limit start temperature D3. The reference temperature D2 is set to a value lower than this limit start temperature D3.

Figure 7:
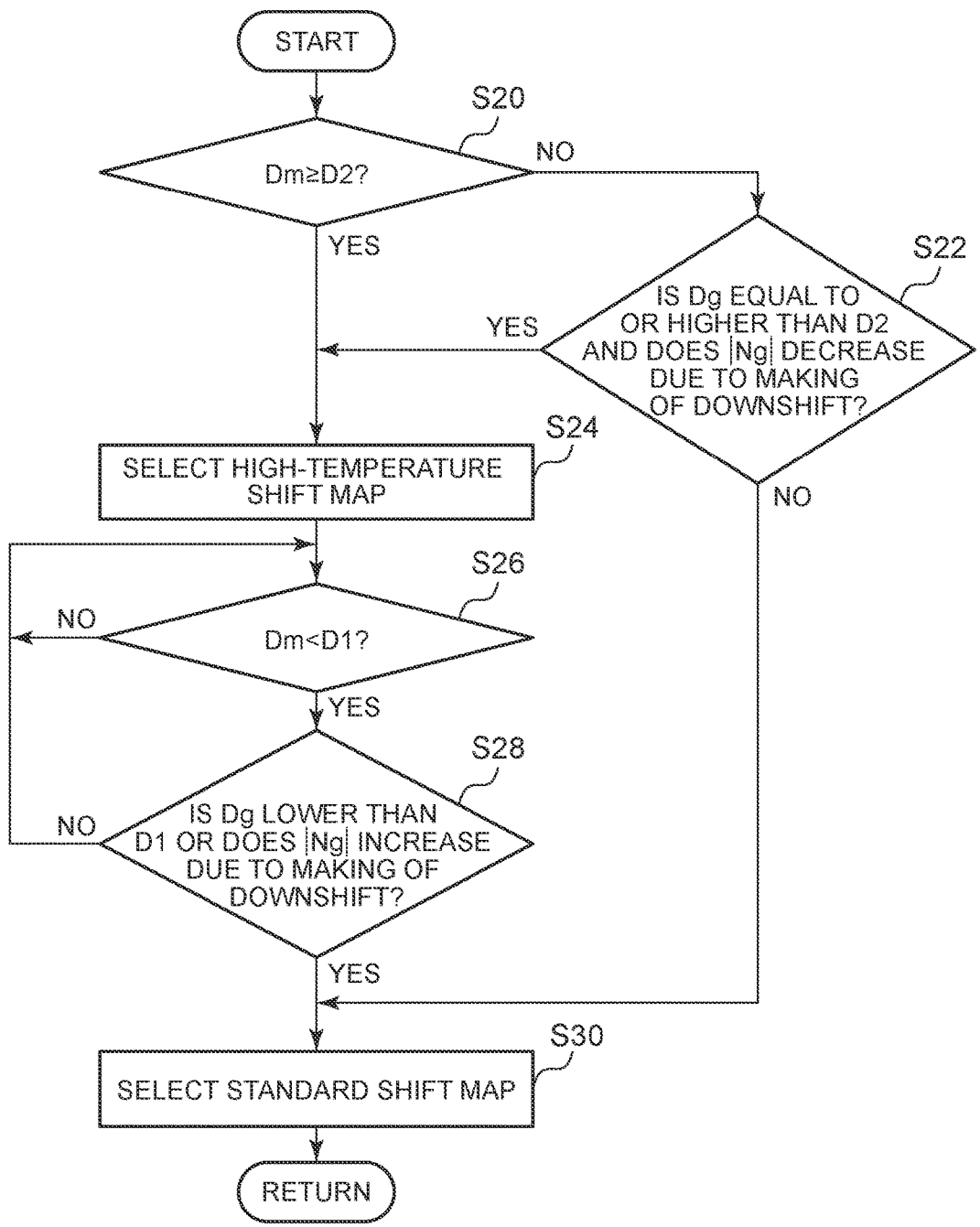
FIG. 7 is a flowchart showing the flow of a shift map selection process of the hybrid vehicle.

FIG. 7 is a flowchart showing the flow of a shift map selection process. The ECU 24 executes the shift map selection process shown in FIG. 7 in parallel with shift control shown in FIG. 3, during hybrid running. This shift map selection process will be described. The ECU 24 first confirms whether or not the temperature Dm of the second rotating electrical machine MG2 is equal to or higher than the prescribed reference temperature D2 (S20). Incidentally, in the present embodiment of the disclosure, it is determined whether or not Dm≥D2 based on the temperature itself of the second rotating electrical machine MG2 detected by the sensor provided in the second rotating electrical machine MG2. However, this determination may be made based on other parameters. For example, it may be determined that Dm≥D2 if the temperature of the cooling medium for cooling the second rotating electrical machine MG2 is equal to or higher than a prescribed cooling medium reference temperature. The temperature of the second rotating electrical machine MG2 may be estimated from the value of a current or the like. As for determination steps of Dm<D1, Dg≥D2 and Dg<D1 (S22, S26 and S28) that will be described later in detail as well, the determinations may be made based on other parameters, or the temperatures of the rotating electrical machines may be estimated from other parameters.

If Dm≥D2, it can be determined that the temperature Dm of the second rotating electrical machine MG2 is close to the limit start temperature D3 and that the temperature thereof needs to be restrained from rising. Accordingly, in this case, a transition to step S24 is made, and the high-temperature shift map is selected as the shift map to be used in shift control.

On the other hand, if Dm<D2, the ECU 24 proceeds to step S22, and confirms whether or not the condition that the temperature Dg of the first rotating electrical machine MG1 is equal to or higher than the reference temperature D2 and that |Ng| decreases due to the making of a downshift is fulfilled. It is determined whether or not Dm≥D2 based on the temperature itself of the second rotating electrical machine MG2 detected by the sensor provided in the rotating electrical machine MG2. However, this determination may be made based on other parameters. For example, it may be determined that Dm≥D2 if the temperature of the cooling medium for cooling the rotating electrical machine MG2 is equal to or higher than the prescribed cooling medium reference temperature. If Dg≥D2, it can be determined that the temperature Dm of the first rotating electrical machine MG1 is close to the limit start temperature D3, and that the temperature thereof needs to be restrained from rising. Besides, if |Ng| decreases due to the making of a downshift, it can be determined that the losses (the iron loss and the mechanical loss) of the first rotating electrical machine MG1 can be reduced by making a downshift. Accordingly, if the result of the determination in step S22 is Yes, the ECU 24 proceeds to step S24, and selects the high-temperature shift map as the shift map to be used in shift control. On the other hand, if both the result of the determination in step S20 and the result of the determination in step S22 are No, the ECU 24 proceeds to step S30, and selects the standard shift map as the shift map.

If the high-temperature shift map is selected in step S24, a downshift is likely to occur, and the losses of the first rotating electrical machine MG1 and the second rotating electrical machine MG2 are likely to decrease. Then, as a result, the temperatures of the first rotating electrical machine and the second rotating electrical machine can be restrained from rising. After selecting the high-temperature shift map, the ECU 24 maintains the state where the high-temperature shift map is selected, until a predetermined condition is fulfilled. In concrete terms, after selecting the high-temperature shift map, the ECU 24 monitors whether or not the temperature Dm of the second rotating electrical machine is lower than the prescribed reference temperature D1 (S26). The reference temperature D1 is an example of each of the second reference temperature and the fourth reference temperature set forth in the claims of the present application. This reference temperature D1 is a temperature that is lower than the reference temperature D2. If Dm≥D1, the ECU 24 continues to maintain the state where the high-temperature shift map is selected. On the other hand, if Dm<D1, the ECU 24 subsequently proceeds to step S28, and monitors whether or not a condition that the temperature Dg of the first rotating electrical machine MG1 is lower than the reference temperature D1 or a condition that |Ng| increases due to the making of a downshift is fulfilled. Then, if Dg≥D1 and |Ng| decreases due to the making of a downshift, the ECU 24 returns to step S26, and continues to maintain the state where the high-temperature shift map is selected. On the other hand, if Dg<D1 or |Ng| increases due to the making of a downshift, the ECU 24 proceeds to step S30, and returns the shift map to the standard shift map. Then, the ECU 24 repeats the same process afterward.

As described above, according to the present embodiment of the disclosure, when the temperatures of the first rotating electrical machine MG1 and the second rotating electrical machine MG2 are high, the value of the accelerator opening degree Acc for the vehicle speed V in making a shift (the shift line) is revised downward. Thus, a downshift is likely to occur. Then, due to the occurrence of a downshift, the losses of the first rotating electrical machine MG1 and the second rotating electrical machine MG2 can be reduced, and the temperatures thereof can be restrained from rising, without lowering the power Po output to the drive shaft.

Incidentally, according to the flowchart of FIG. 7, if the temperature Dm of the second rotating electrical machine MG2 is equal to or higher than the reference temperature D2 (Yes in S20), the high-temperature shift map is selected even in the case where |Ng| increases due to the making of a downshift. In this case, the copper loss of the second rotating electrical machine MG2 is reduced by making a downshift, but the iron loss and mechanical loss of the first rotating electrical machine MG1 increase. As a result, the temperature Dm of the second rotating electrical machine MG2 can be lowered due to the making of a downshift, but the temperature Dg of the first rotating electrical machine MG1 rises. However, as described already, the iron loss and mechanical loss are generally smaller than the copper loss in a rotating electrical machine. Therefore, even in the case where |Ng| increases when a downshift is made, the speed of rise in the temperature of the first rotating electrical machine MG1 is estimated to be relatively low, and the influence is estimated to be small. On the other hand, when the rotational speed Nm is low and the torque Tm remains large, the speed of rise in the temperature of the second rotating electrical machine MG2 is high, and the second rotating electrical machine MG2 may reach the limit start temperature D3 in a relatively short time. Thus, if Dm≥D2 and |Ng| increases due to the making of a downshift, priority is given to a fall in the temperature of the second rotating electrical machine MG2, and the high-temperature shift map is selected so that a downshift is likely to be made. That is, until Dm<D1, the result of the determination in step S26 is No, so the selection of the high-temperature shift map is maintained.

Incidentally, the configuration described hitherto is an example. As long as the value of the accelerator opening degree Acc for the vehicle speed V in making a downshift is revised downward from a standard value when the generator condition and/or the electric motor condition are/is fulfilled, other details of the configuration may be appropriately changed. For example, in the aforementioned embodiment of the disclosure, the shift map is selected in consideration of both the temperature of the first rotating electrical machine MG1 and the temperature of the second rotating electrical machine MG2. However, the shift map may be selected without considering one of the temperatures. That is, the shift map may be selected in accordance with flowcharts shown in FIGS. 8, 9, 10 and 11.

Figure 8:
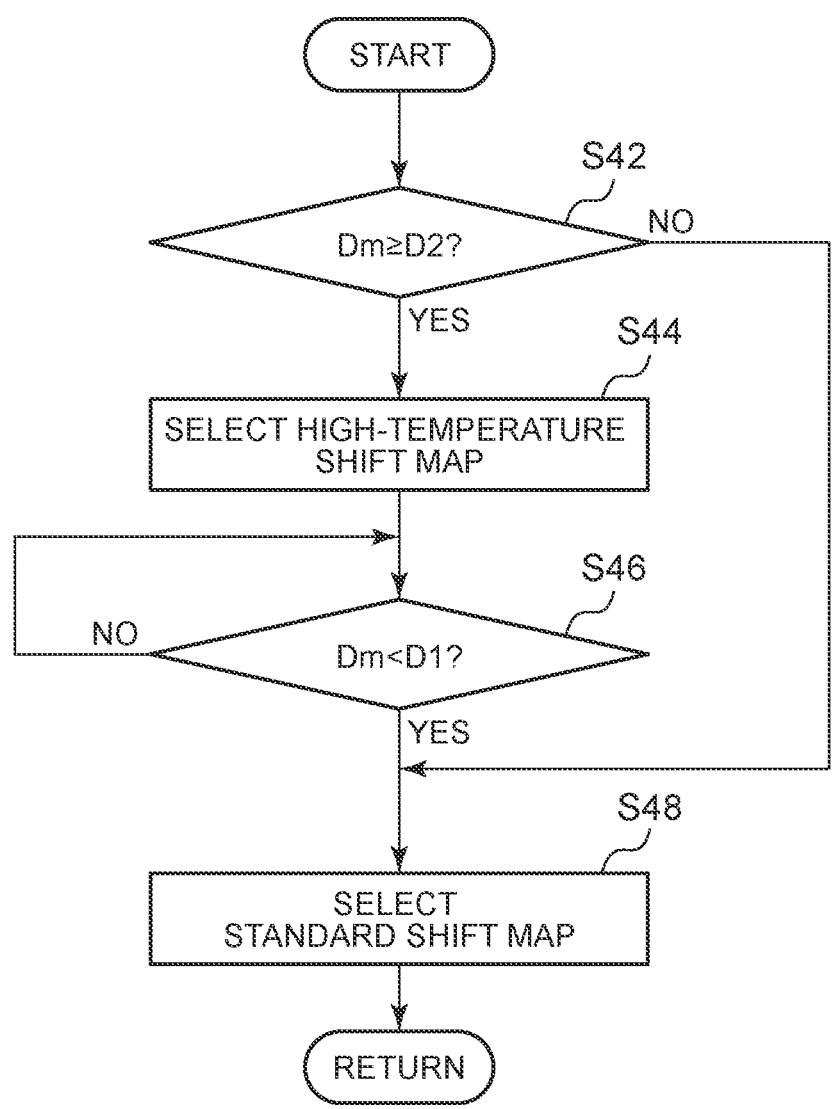
FIG. 8 is a flowchart showing the flow of a shift map selection process in a first modification example of the present embodiment of the disclosure.

Thus, a first modification example of the present embodiment of the disclosure will be described. FIG. 8 is a flowchart showing the control of the first modification example, in the case where a shift map is selected. In this control, the shift map is selected in consideration of the temperature Dm of the second rotating electrical machine MG2 but without considering the temperature Dg of the first rotating electrical machine MG1. As shown in FIG. 8, in this case, if the temperature Dm of the second rotating electrical machine MG2 is equal to or higher than the reference temperature D2, the high-temperature shift map is selected (S42, S44). If the temperature Dm of the second rotating electrical machine MG2 becomes lower than the reference temperature D1, the standard shift map is selected (S46, S48). This process is effective, for example, when the temperature of the second rotating electrical machine MG2 is likely to become higher than the temperature of the first rotating electrical machine MG1, when the permissible temperature of the second rotating electrical machine MG2 is lower than the permissible temperature of the first rotating electrical machine MG1, etc.

Figure 9:
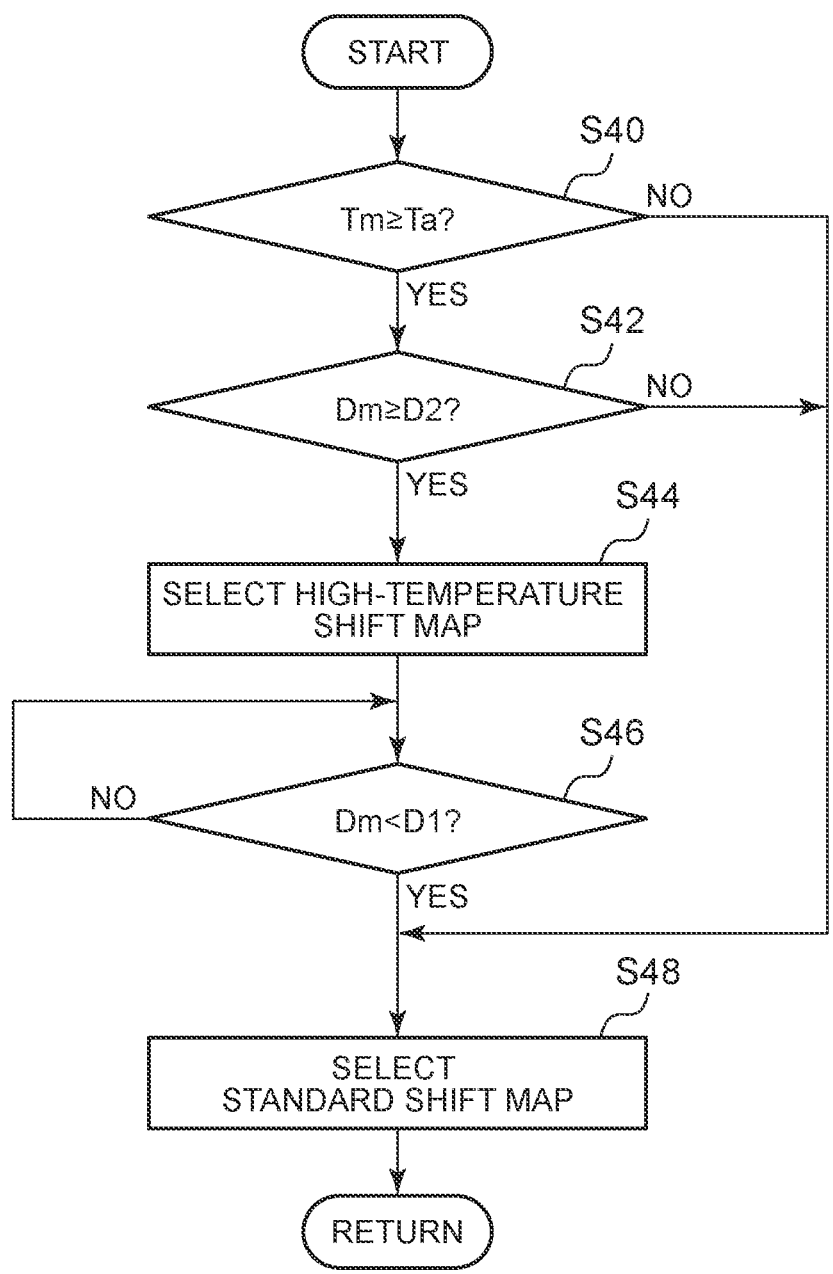
FIG. 9 is a flowchart showing the flow of a shift map selection process in a second modification example of the present embodiment of the disclosure.

Next, a second modification example of the present embodiment of the disclosure will be described. In the description of the aforementioned first modification example, it is mentioned only that the temperature Dm of the second rotating electrical machine MG2 is equal to or higher than the reference temperature D2, as the electric motor condition. However, the electric motor condition may further include that the torque Tm of the second rotating electrical machine MG2 is equal to or larger than a reference torque Ta. That is, in the control of the second modification example, as shown in FIG. 9, when the shift map selection process is executed, it is first confirmed whether or not the torque Tm of the second rotating electrical machine MG2 is equal to or larger than the reference torque Ta (S40). Then, if Tm<Ta, the standard shift map may be selected even in the case where Dm≥D2. This step S40 is added for the following reason. When the torque Tm of the second rotating electrical machine MG2 is small, the ratio of the copper loss to the loss of the entire second rotating electrical machine MG2 is also often small. In this case, even when the torque Tm is lowered and hence the copper loss is lowered through a downshift, this lowering of the torque Tm and hence the copper loss is estimated to hardly contribute to a fall in temperature. That is, in the case where the torque Tm is small, a fall in temperature is estimated to be impossible even when a downshift is made. Accordingly, in this case, it is advisable to perform shift control based on the standard shift map, without revising the shift lines downward. In this manner, the electric motor condition also includes that the torque Tm is equal to or larger than the reference torque Ta, so the shift lines can be prevented from being revised unnecessarily, and more appropriate shift control is made possible.

Next, a third modification example of the present embodiment of the disclosure will be described. FIG. 10 is a flowchart showing the control of the third modification example, in the case where a shift map is selected. In this control, the shift map is selected in consideration of the temperature Dg of the first rotating electrical machine MG1 but without considering the temperature Dm of the second rotating electrical machine MG2. As shown in FIG. 10, in this case, if the temperature Dg of the first rotating electrical machine MG1 is equal to or higher than the reference temperature D2 and |Ng| decreases as a downshift is made, the high-temperature shift map is selected (S52, S54). Besides, if the temperature Dg of the first rotating electrical machine MG1 is lower than the reference temperature D1 or |Ng| increases due to the making of a downshift after the high-temperature shift map is selected, the standard shift map is selected (S56, S58). This process is effective, for example, when the temperature of the first rotating electrical machine MG1 is likely to becomes higher than the temperature of the second rotating electrical machine MG2, when the permissible temperature of the first rotating electrical machine MG1 is lower than the permissible temperature of the second rotating electrical machine MG2, etc.

Besides, in the description of the aforementioned first to third modification examples, the reference temperatures D1 and D2 to be compared with the temperature Dg of the first rotating electrical machine MG1 are equal to the reference temperatures D1 and D2 to be compared with the temperature Dm of the second rotating electrical machine MG2, respectively. However, the values of the reference temperatures for comparison may be appropriately changed in accordance with the temperature characteristics and the like of the first rotating electrical machine MG1 and the second rotating electrical machine MG2. That is, in FIG. 7, the temperatures of the rotating electrical machines are compared with the reference temperature D2 in steps S20 and S22. For example, however, the temperature Dm may be compared with an electric motor reference temperature D2_m in step S20, and the temperature Dg may be compared with a generator reference temperature D2_g in step S22 (N.B., D2_g≠D2_m). Besides, the temperature Dm may be compared with an electric motor reference temperature D1_m in step S26, and the temperature Dg may be compared with a generator reference temperature D1_g in step S28 (N.B., D1_g≠D1_m).

Next, a fourth modification example of the present embodiment of the disclosure will be described. In the description of the aforementioned third modification example, it is mentioned that the temperature Dg of the first rotating electrical machine MG1 is equal to or higher than the reference temperature D2 and that |Ng| decreases due to the making of a downshift, as the generator condition. However, in addition to these conditions, the generator condition may further include that the vehicle speed V is equal to or higher than a reference value. For example, as shown in FIG. 11, when the shift map selection process is executed, it is first confirmed whether the vehicle speed V is equal to or higher than a reference vehicle speed Va (S50). If V<Va, the standard shift map may be selected even in the case where Dg≥D2.

This step S50 is added for the following reason. When the vehicle speed V is low, the rotational speed Ng of the first rotating electrical machine MG1 is also likely to be low. In this case, the temperature of the first rotating electrical machine MG1 does not fall even when a downshift is made. Alternatively, even when the temperature of the first rotating electrical machine MG1 falls, the speed of fall in the temperature is estimated to be very low. Accordingly, when the vehicle speed V is low, shift control based on the standard shift map may be performed without revising the shift lines downward. In this manner, the generator condition also includes that the vehicle speed V is equal to or higher than the reference vehicle speed Va, so the shift lines can be prevented from being revised unnecessarily, and more appropriate shift control is made possible.

Besides, in the foregoing description, only the single high-temperature shift map is used. However, one of different high-temperature shift maps (down lines with different downward revision amounts from a standard value) may be used depending on whether the generator condition or the electric motor condition is fulfilled. For example, the high-temperature shift map with a relatively small downward revision amount may be selected when only the generator condition is fulfilled, and the high-temperature shift map with a large downward revision amount may be selected when at least the electric motor condition is fulfilled. Besides, in the aforementioned embodiment of the disclosure, the values of the accelerator opening degree Acc for the vehicle speed V in making a shift (the down reference value and the up reference value) are stored as the maps. However, the down reference value and the up reference value may be stored in other forms instead of being stored as maps. For example, the down reference value and the up reference value may be stored in the form of tables, functions or the like.

What is claimed is:

1. A hybrid vehicle comprising:
    an engine;
    a generator;
    an electric motor;
    a drive shaft that is configured to transmit a driving force to a wheel;
    a stepped transmission that is interposed between the electric motor and the drive shaft;
    a power split mechanism that is configured to (i) mechanically couple three elements to one another, the three elements being a rotary shaft of the electric motor, an output shaft of the engine and a rotary shaft of the generator, and (ii) use one of the three elements as a reaction element to transmit a power between the other two elements; and
    an electronic control unit that is configured to control driving of the engine, the generator, the electric motor and the stepped transmission,
    wherein the electronic control unit stores a first shift map including a first down line that indicates a relationship between a vehicle speed and an accelerator opening degree, and a second shift map including a second down line that indicates a relationship between a vehicle speed and an accelerator opening degree,
    wherein, as compared with the accelerator opening degree of the first down line and the accelerator opening degree of the second down line when the vehicle speeds are the same, the accelerator opening degree of the first down line is smaller than the accelerator opening degree of the second down line,
    wherein the electronic control unit controls the driving of the stepped transmission based on the first shift map when a prescribed generator condition is fulfilled, and controls the driving of the stepped transmission based on the second shift map when the prescribed generator condition is not fulfilled, and
    wherein the prescribed generator condition includes a condition that a temperature of the generator is equal to or higher than a prescribed first reference temperature and a condition that an absolute value of a rotational speed of the generator decreases by making the downshift.

2. The hybrid vehicle according to claim 1, wherein the electronic control unit is configured to control the driving of the stepped transmission based on the second shift map when the temperature of the generator drops below a second reference temperature that is lower than the first reference temperature in a state where the electronic control unit controls the driving of the stepped transmission based on the first shift map.

3. The hybrid vehicle according to claim 1, wherein the electronic control unit is configured to control the driving of the stepped transmission based on the second shift map when the absolute value of the rotational speed of the generator increases due to making of the downshift in a state where the electronic control unit controls the driving of the stepped transmission based on the first shift map.

4. The hybrid vehicle according to claim 1, wherein the electronic control unit is configured to control the driving of the stepped transmission based on the first shift map when at least one of the generator condition and a prescribed electric motor condition is fulfilled, the electric motor condition being at least a condition that a temperature of the electric motor is equal to or higher than a prescribed third reference temperature.

5. The hybrid vehicle according to claim 4, wherein the electronic control unit is configured to control the driving of the stepped transmission based on the second shift map when both a first condition and a second condition are fulfilled in a state where the electronic control unit controls the driving of the stepped transmission based on the first shift map,
the first condition being a condition that the temperature of the generator drops below a second reference temperature that is lower than the first reference temperature, and
the second condition being a condition that the temperature of the electric motor drops below a fourth reference temperature that is lower than the third reference temperature.

6. The hybrid vehicle according to claim 4, wherein the electronic control unit is configured to control the driving of the stepped transmission when both a first condition and a second condition are fulfilled in a state where the electronic control unit controls the driving of the stepped transmission based on the first shift map,
the first condition being a condition that the temperature of the generator drops below a second reference temperature that is lower than the first reference temperature, and
the second condition being a condition that the absolute value of the rotational speed of the generator increases due to making of the downshift.

7. The hybrid vehicle according to claim 4, wherein the electric motor condition further includes a condition that an output torque of the electric motor is equal to or larger than a predetermined value.

8. The hybrid vehicle according to claim 4, wherein the electronic control unit is configured to limit an output of the electric motor more when the temperature of the electric motor becomes equal to or higher than a prescribed limit start temperature than when the temperature of the electric motor is lower than the limit start temperature, and
the third reference temperature is lower than the limit start temperature.

9. The hybrid vehicle according to claim 1, wherein the generator condition further includes a condition that the vehicle speed is equal to or higher than a predetermined value.

10. The hybrid vehicle according to any one of claim 1, wherein
the electronic control unit is configured to limit an output of the generator more when the temperature of the generator becomes equal to or higher than a prescribed limit start temperature than when the temperature of the generator is lower than the limit start temperature, and the first reference temperature is lower than the limit start temperature.

11. A hybrid vehicle comprising:
an engine;
a generator;
an electric motor;
a drive shaft that is configured to transmit a driving force to a wheel;
a stepped transmission that is interposed between the electric motor and the drive shaft;
a power split mechanism that is configured to mechanically couple three elements to one another, the three elements being a rotary shaft of the electric motor, an output shaft of the engine and a rotary shaft of the generator and (ii) use one of the three elements as a reaction element to transmit a power between the other two elements; and
an electronic control unit that is configured to control driving of the engine, the generator, the electric motor and the stepped transmission,
wherein the electronic control unit stores a first shift map including a first down line that indicates a relationship between a vehicle speed and an accelerator opening degree, and a second shift map including a second down line that indicates a relationship between a vehicle speed and an accelerator opening degree,
wherein, as compared with the accelerator opening degree of the first down line and the accelerator opening degree of the second down line when the vehicle speeds are the same, the accelerator opening degree of the first down line is smaller than the accelerator opening degree of the second down line,
wherein the electronic control unit controls the driving of the stepped transmission based on the first shift map when a prescribed generator condition is fulfilled, and controls the driving of the stepped transmission based on the second shift map when the prescribed generator condition is not fulfilled, and,
wherein the electric motor condition is at least a condition that a temperature of the electric motor is equal to or higher than a prescribed third reference temperature.

12. The hybrid vehicle according to claim 11, wherein the electronic control unit is configured to control the driving of the stepped transmission based on the second shift map when the temperature of the electric motor drops below a fourth reference temperature that is lower than the third reference temperature in a state where the electronic control unit controls the driving of the stepped transmission based on the first shift map.

13. The hybrid vehicle according to claim 11, wherein the electric motor condition further includes a condition that an output torque of the electric motor is equal to or larger than a predetermined value.

14. The hybrid vehicle according to claim 13, wherein the electronic control unit is configured to limit an output of the electric motor more when the temperature of the electric motor becomes equal to or higher than a prescribed limit start temperature than when the temperature of the electric motor is lower than the limit start temperature, and
the third reference temperature is lower than the limit start temperature.

* * * * *